US008687801B2

(12) United States Patent
Kim et al.

(10) Patent No.: US 8,687,801 B2
(45) Date of Patent: Apr. 1, 2014

(54) METHOD AND APPARATUS FOR ACQUIRING DOMAIN INFORMATION AND DOMAIN-RELATED DATA

(75) Inventors: Bong-seon Kim, Seongnam-si (KR); Young-sun Yoon, Suwon-si (KR); Su-hyun Nam, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1629 days.

(21) Appl. No.: 11/648,677

(22) Filed: Jan. 3, 2007

(65) Prior Publication Data

US 2007/0242821 A1 Oct. 18, 2007

Related U.S. Application Data

(60) Provisional application No. 60/755,095, filed on Jan. 3, 2006.

(30) Foreign Application Priority Data

Apr. 26, 2006 (KR) .................. 10-2006-0037717

(51) Int. Cl.
 *H04K 1/00* (2006.01)
(52) U.S. Cl.
 USPC .... 380/28; 380/277; 348/E5.005; 375/E7.009
(58) Field of Classification Search
 USPC .................................................. 380/28, 277
 See application file for complete search history.

(56) References Cited

U.S. PATENT DOCUMENTS

| 7,389,273 B2 * | 6/2008 | Irwin et al. ...................... 705/59 |
| 7,512,987 B2 * | 3/2009 | Williams ........................ 726/27 |
| 7,523,310 B2 * | 4/2009 | Narin et al. .................... 713/172 |
| 7,676,846 B2 * | 3/2010 | Robert et al. ................... 726/27 |
| 2004/0103312 A1 * | 5/2004 | Messerges et al. ........... 713/201 |
| 2005/0086532 A1 * | 4/2005 | Lotspiech et al. ............ 713/201 |
| 2005/0120216 A1 | 6/2005 | Lee et al. |
| 2005/0193199 A1 | 9/2005 | Asokan et al. |
| 2005/0210261 A1 | 9/2005 | Kamperman et al. |
| 2006/0282391 A1 * | 12/2006 | Peterka et al. .................. 705/57 |
| 2007/0056040 A1 * | 3/2007 | Van Den Heuvel et al. .... 726/26 |

FOREIGN PATENT DOCUMENTS

| JP | 2005-526330 A | 9/2005 |
| JP | 2007-512795 A | 5/2007 |
| KR | 2004/0074494 A | 5/2004 |
| KR | 2005/0032324 A | 4/2005 |

(Continued)

OTHER PUBLICATIONS

Gildred J. et al.: "Protected entertainment rights management (PERM)," Internet Citation, (Online) Jun. 25, 2004.

(Continued)

*Primary Examiner* — Amare F Tabor
(74) *Attorney, Agent, or Firm* — Sughrue Mion, PLLC

(57) ABSTRACT

Provided are a method and apparatus for acquiring data regarding a domain for the protection of digital content, and more particularly, a method and apparatus for acquiring domain information and domain-related data in which content received from an external source is converted into content that complies with a set of rules of a digital rights management (DRM) system and a license for the use of the result of the conversion is issued by receiving domain information including a domain key identifier from a domain information providing apparatus and receiving an updated domain key that is a valid domain key currently being used in a domain from a DRM object providing apparatus.

34 Claims, 9 Drawing Sheets

(56) References Cited

FOREIGN PATENT DOCUMENTS

| KR | 2005/0059027 A | 6/2005 |
| WO | WO 2004/038568 A | 5/2004 |
| WO | 2005055521 A1 | 6/2005 |

OTHER PUBLICATIONS

DVB—Digital Video Broadcasting: "Digital video broadcasting (DVB)," DVB Document, vol. A094, Nov. 2005, p. 103.
Communication dated Sep. 17, 2012, issued by the Taiwanese Patent Office in counterpart Taiwanese Patent Application No. 095147618.
J. Gildred et al., "Protected Entertainment Rights Management (PERM) draft—gildred—perm—02", Jan. 15, 2005, 93 pages.
Hibbert, Chris, "Digital Video Broadcasting—Content Protection & Copy Management", Jan. 11, 2005, 24 pages.
Office Action issued May 28, 2010, in counterpart Taiwanese Application No. 95147618.
Communication dated Jul. 10, 2013 issued by the Taiwanese Patent Office in corresponding Application No. 095147618.
Communication from the Japanese Patent Office dated Jan. 31, 2012 in a counterpart application No. 2006-348437.

* cited by examiner

METHOD AND APPARATUS FOR ACQUIRING DOMAIN INFORMATION AND DOMAIN-RELATED DATA

CROSS-REFERENCE TO RELATED PATENT APPLICATION

This application claims priority from Korean Patent Application No. 10-2006-0037717, filed on Apr. 26, 2006, in the Korean Intellectual Property Office, and from U.S. Provisional Application No. 60/755,095, filed on Jan. 3, 2006, in the U.S. Patent & Trademark Office, the disclosures of which are incorporated herein in their entirety by reference.

BACKGROUND OF THE INVENTION

1. Field of the Invention

Apparatuses and methods consistent with the present invention relate to acquiring domain information and domain-related data for the protection of digital content.

2. Description of the Related Art

As the types of multimedia devices providing broadcast, music, and game services in a home network have become more diversified, the types of digital content which can be used in such multimedia devices have diversified. Customers wish to conveniently share digital content between a variety of multimedia devices in a home network. As part of efforts to meet this demand, research has been vigorously conducted on home network domain techniques which allow digital content to be shared between a plurality of devices by connecting the devices. In order for digital content within a predetermined home domain to be freely sharable only between a plurality of devices which are members of the predetermined home domain, methods of protecting the digital content within the predetermined home domain by appropriately restricting the use of the digital content by those which are not members of the predetermined home domain are needed.

SUMMARY OF THE INVENTION

The present invention provides a method and apparatus for acquiring domain information and domain-related data which are needed to convert content received from an external source into content that complies with a set of rules of a digital rights management (DRM) system and issue a license for the use of the result of the conversion for the protection of digital content.

The present invention also provides a computer-readable recording medium storing a computer program for executing the acquiring method.

According to an aspect of the present invention, there is provided an apparatus for acquiring data regarding a domain. The apparatus includes an import function module which receives domain information comprising a domain key identifier corresponding to the domain; and a digital rights management (DRM) client module which receives an updated domain key which is a valid domain key currently being used in the domain.

According to another aspect of the present invention, there is provided an apparatus equipped with an import function module. The apparatus includes a first request unit which issues a request for domain information to a domain information providing apparatus; a first reception unit which receives the domain information in response to the request issued by the first request unit; and a second reception unit which receives an updated domain key which is a valid domain key currently being used in a domain from an apparatus equipped with a DRM client module.

According to another aspect of the present invention, there is provided an apparatus equipped with a DRM client module. The apparatus includes a determination unit which determines whether a previously stored domain key needs to be updated; a request unit which issues a domain key update request to the DRM object providing apparatus if the determination unit determines that the previously stored domain key needs to be updated; and a reception unit which receives the updated domain key from the DRM object providing apparatus in response to the domain key update request.

According to another aspect of the present invention, there is provided an apparatus for acquiring data regarding a domain. The apparatus includes an import function module which receives domain information comprising a domain key identifier; and a DRM client module which determines whether a previously stored domain key is valid and can thus be used in the domain.

According to another aspect of the present invention, there is provided a method of acquiring data regarding a domain which is performed by an apparatus belonging to the domain. The method includes (a) receiving domain information comprising a domain key identifier from a domain information providing apparatus; and (b) receiving an updated domain key from a DRM object providing apparatus, wherein (a) is performed by an import function module of the apparatus which converts content received from an external source into content that complies with a set of rules of a DRM system, and (b) is performed by a DRM client module of the apparatus which has requested domain-related data corresponding to the domain.

According to another aspect of the present invention, there is provided a computer-readable recording medium storing a computer program for executing the acquiring method.

According to yet another aspect of the present invention, there is provided a method of importing content. The method includes receiving content to be imported; receiving latest information about a domain from a domain information providing apparatus; and importing the content using the latest information.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE INVENTION

The present invention will now be described more fully with reference to the accompanying drawings in which exemplary embodiments of the invention are shown.

Figure 1:
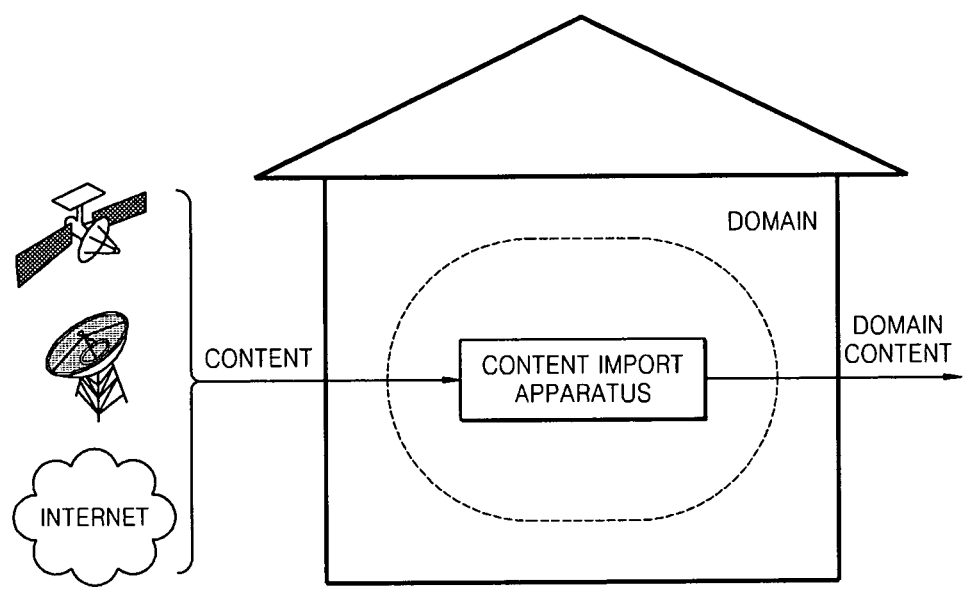
FIG. 1 is a diagram illustrating a circumstance where domain information needs to be acquired to protect content according to an exemplary embodiment of the present invention.

FIG. 1 is a diagram illustrating a circumstance where domain information needs to be acquired in order to protect content according to an exemplary embodiment of the present invention. Referring to FIG. 1, a content import apparatus according to an exemplary embodiment of the present invention receives content from an external source. The content import apparatus converts content into domain content that complies with a set of rules of a digital rights management (DRM) system and issues a license for the use of the domain content such that the domain content can be safely shared within a domain. The domain content is content encrypted with a domain key. Therefore, the content import apparatus needs to acquire domain information and domain-related data which are needed to issue a license and encrypt content.

Figure 2:
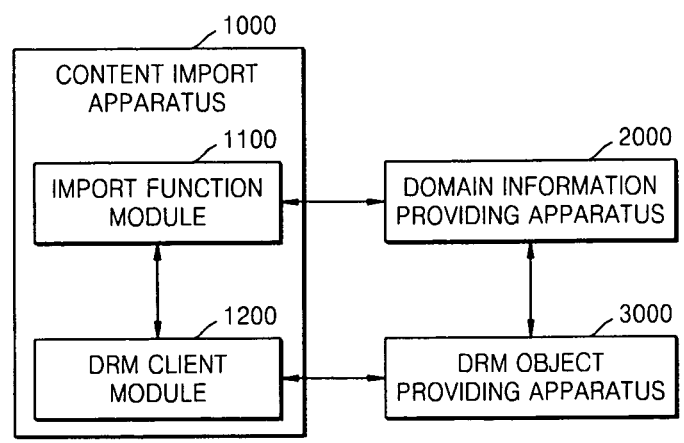
FIG. 2 is a block diagram of a content import apparatus according to an exemplary embodiment of the present invention, which receives domain information and an updated domain key.

FIG. 2 is a block diagram of a content import apparatus 1000 according to an exemplary embodiment of the present invention, which receives domain information and an updated domain key. Referring to FIG. 2, the content import apparatus 1000 includes an import function module 1100 and a DRM client module 1200.

The import function module 1100 imports content from an external source as domain content. For example, as shown in FIG. 2, the import function module 1100 receives from a domain information providing apparatus 2000 domain information which is needed to import the received content as domain content. The DRM client module 1200 issues to a DRM object providing apparatus 3000 a request for domain-related data which is needed to import the received content as domain content, and receives the domain-related data from the DRM object providing apparatus 3000. In detail, the DRM client module 1200 issues a request for an updated domain key to the DRM object providing apparatus 3000 and receives the updated domain key from the DRM object providing apparatus 3000.

According to an exemplary embodiment of the present embodiment, the content import apparatus 1000, the domain information providing apparatus 2000, and the DRM object providing apparatus 3000 may be separate apparatuses which are subscribers of the same domain. In particular, according to an exemplary embodiment of the present embodiment, the domain information providing apparatus 2000 and the DRM object providing apparatus 3000 may be separate apparatuses. However, since the domain information providing apparatus 2000 and the DRM object providing apparatus 3000 both serve as domain managers, they can be integrated into a single apparatus. According to an exemplary embodiment of the present embodiment, since the content import apparatus 1000, the domain information providing apparatus 2000, and the DRM object providing apparatus 3000 are subscribers of the same domain, the term 'domain information' recited in this disclosure refers to all information regarding the characteristics of the domain to which the content import apparatus 1000, the domain information providing apparatus 2000, and the DRM object providing apparatus 3000 subscribe.

Figure 3:
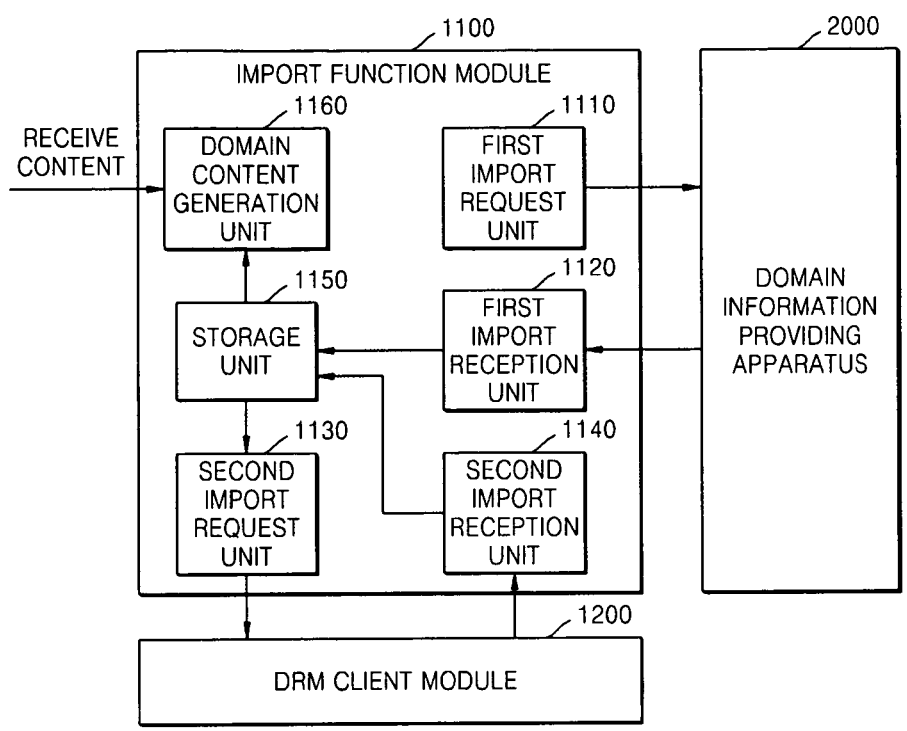
FIG. 3 is a detailed block diagram of an import function module illustrated in FIG. 2 according to an exemplary embodiment of the present invention.

FIG. 3 is a detailed block diagram of the import function module 1100 illustrated in FIG. 2 according to an exemplary embodiment of the present invention. Referring to FIG. 3, the import function module 1100 includes a first import request unit 1110, a first import reception unit 1120, a second import request unit 1130, a second import reception unit 1140, a storage unit 1150, and a domain content generation unit 1160.

The first import request unit 1110 issues to the domain information providing apparatus 2000 a request for domain information which is needed to import content from an external source as domain content.

The first import reception unit 1120 receives domain information in response to the request issued by the first import request unit 1110 from the domain information providing apparatus 2000.

Here, the domain information may be information regarding a set of domain rules needed to encrypt the received content into domain content that complies with rules of a DRM system and to issue a license for the use of the domain content.

A response message containing the domain information also contains an identifier of a predetermined domain where domain content corresponding to the received content is to be used, an identifier of a policy followed by the predetermined domain, location information of the predetermined domain, location information of the DRM object providing apparatus 3000 from which domain-related data regarding the predetermined domain can be acquired, an identifier of a domain key which is an encryption key corresponding to the predetermined domain, and membership state information of the predetermined domain which is information used to generate a license when importing the received content as domain content.

The membership state information may be time information indicating when domain membership of a device which has subscribed to the predetermined domain according to the policy followed by the predetermined domain will expire. If the device has withdrawn from the predetermined domain and thus is not a member of the predetermined domain any longer, the time when the device withdrew from the predetermined domain is recorded in the membership state information. The content import apparatus 1000 may decide whether to issue a license for the use of domain content to a device with reference to membership state information.

The domain information received by the first import reception unit 1200 is stored in the storage unit 1150.

The second import request unit 1130 issues a request to the DRM client module 1200 to determine whether a domain key stored in the DRM client module 1200 needs to be updated.

The second import reception unit 1140 receives domain-related data including an updated domain key which is a valid domain key currently being used in the predetermined domain from the DRM client module 1200. The second import reception unit 1140 transmits the domain-related data received by the second import reception unit 1140 in the storage unit 1150.

The domain content generation unit 1160 imports the received content as domain content using the domain information including the updated domain key and the domain-related data stored in the storage unit 1150.

Figure 4:
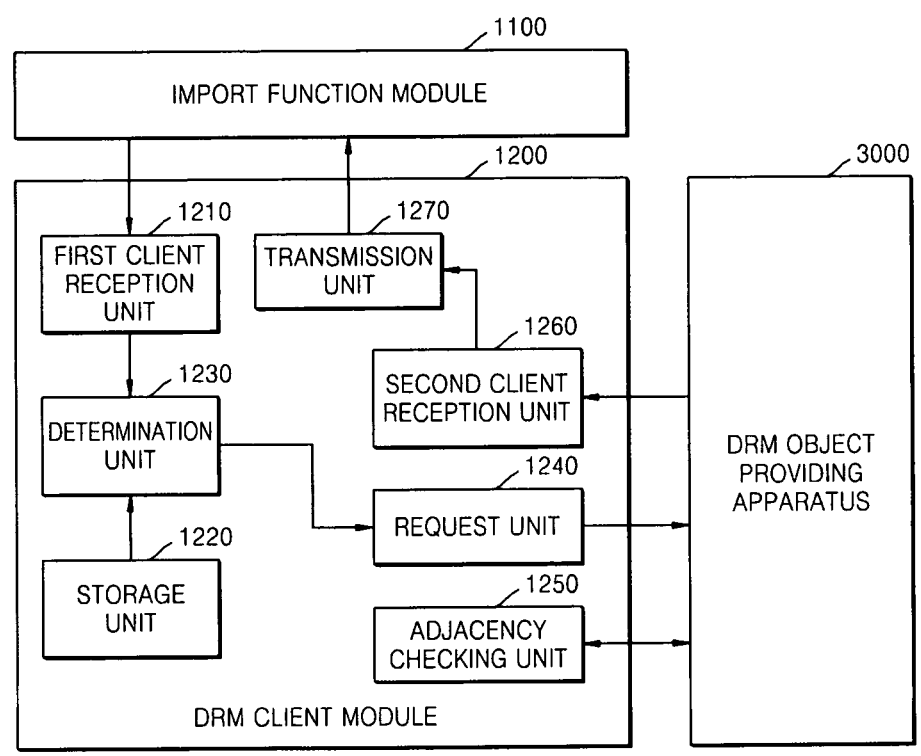
FIG. 4 is a detailed block diagram of a DRM client module illustrated in FIG. 2 according to an exemplary embodiment of the present invention.

FIG. 4 is a detailed block diagram of the DRM client module 1200 illustrated in FIG. 2 according to an exemplary embodiment of the present invention. Referring to FIG. 4, the DRM client module 1200 includes a first client reception unit 1210, a storage unit 1220, a determination unit 1230, a request unit 1240, an adjacency checking unit 1250, a second client reception unit 1260, and a transmission unit 1270.

The first client reception unit 1210 receives a request from the import function module 1100 to determine whether a domain key stored in the storage unit 1220 needs to be updated.

The storage unit 1220 stores a domain key needed for the use of domain content. In detail, the storage unit 1220 initially stores a domain key and domain-related data which were used when the predetermined domain was established. Whenever the domain key is updated, the storage unit 1220 receives and stores the result of the updating. However, the storage unit 1220 may not be able to receive an updated domain key sometimes. Therefore, it is necessary to compare a domain key identifier received from the domain information providing apparatus 2000 with an identifier of the domain key stored in the storage unit 1220.

The determination unit 1230 compares the identifier of the domain key stored in the storage unit 1220 with the received domain key identifier. A plurality of domain keys can be respectively identified by a plurality of unique identifiers. Thus, it is possible to determine whether the domain key stored in the storage unit 1220 is identical to a domain key corresponding to the received domain key identifier. If the identifier of the domain key stored in the storage unit 1220 and the received domain key identifier are identical, there is no need to update the domain key stored in the storage unit 1220, and thus, domain-related data which is stored in the content import apparatus 1000 is determined as being valid. However, if the identifier of the domain key stored in the storage unit 1220 and the received domain key identifier are not identical, the determination unit 1230 determines that the domain key stored in the storage unit 1220 needs to be updated and thus notifies the request unit 1240 that there is the need to update the domain key stored in the storage unit 1220.

The request unit 1240 issues a domain key update request to the DRM object providing apparatus 3000.

The adjacency checking unit 1250 determines whether the DRM object providing apparatus 3000 is adjacent to the DRM client module 1200 by performing an adjacency checking operation. The adjacency checking operation is initiated by the DRM object providing apparatus 3000. In detail, the adjacency checking unit 1250 receives a message transmitted by the DRM object providing apparatus 3000 for the adjacency checking operation and transmits a response message to the DRM object providing apparatus 3000 in return for the received message. Then the DRM object providing apparatus 3000 measures the time taken to receive the message transmitted by the adjacency checking unit 1250 and learns whether the DRM object providing apparatus 3000 is adjacent to the content import apparatus 1000.

If the DRM object providing apparatus 3000 is adjacent to the content import apparatus 1000, the second client reception unit 1260 receives an updated domain key from the DRM object providing apparatus 3000 and transmits the updated domain key to the transmission unit 1270. When receiving the updated domain key, the second client reception unit 1260 may also receive from the DRM object providing apparatus 3000 domain-related data which is needed to convert the received content into domain content.

The transmission unit 1270 transmits the updated domain key and the domain-related data received by the second client reception unit 1260 to the import function module 1100.

Figure 5:
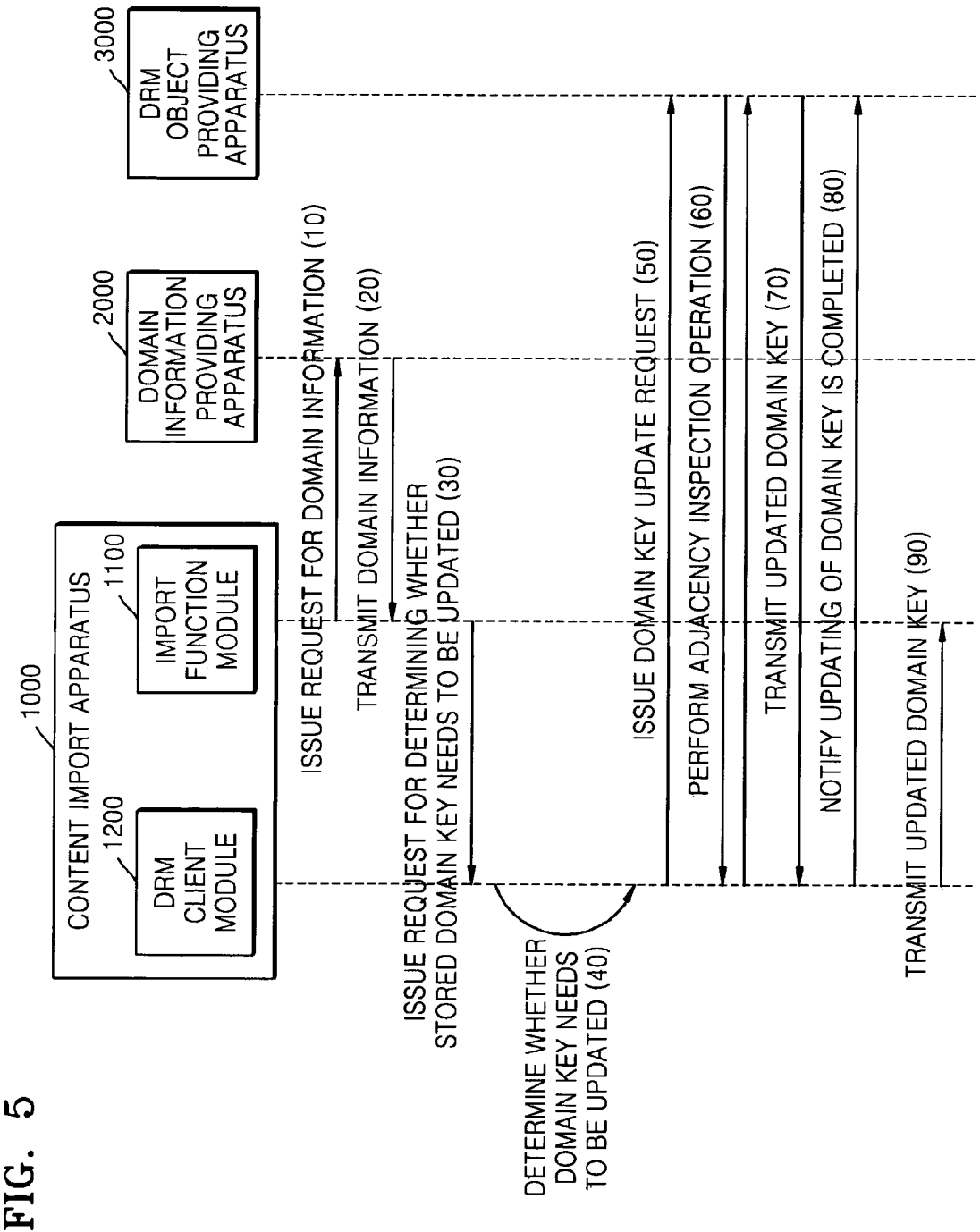
FIG. 5 is a diagram explaining the acquiring of domain information and an updated domain key by a content import apparatus according to an exemplary embodiment of the present invention.

FIG. 5 is a diagram for explaining the acquiring of domain information and an updated domain key by the content import apparatus 1000 illustrated in FIG. 2 according to an exemplary embodiment of the present invention. Referring to FIG. 5, the content import apparatus 1000 acquires domain information and an updated domain key which are needed to encrypt content received from an external source into domain content that complies with a set of rules of a DRM system by sequentially performing a plurality of operations which will now be described in detail.

In operation 10, the import function module 1100 of the content import apparatus 1000 issues a request for domain information to the domain information providing apparatus 2000. Here, the domain information providing apparatus 2000 is an apparatus for providing domain information to a plurality of devices which are subscribers of a predetermined domain.

In operation 20, the domain information providing apparatus 2000 transmits a response message containing domain information to the content import apparatus 1000 in response to the request issued by the import function module 1100. Here, the domain information may be information needed to encrypt content received from an external source into domain content according to a set of rules of a DRM system and to issue a license for the use of the domain content.

The response message containing the domain information also contains an identifier of the predetermined domain where domain content corresponding to the received content is to be used, an identifier of a policy followed by the predetermined domain, location information of the predetermined domain, location information of the DRM object providing apparatus 3000 from which domain-related data regarding the predetermined domain can be acquired, an identifier of a domain key which is an encryption key corresponding to the predetermined domain, and membership state information of the predetermined domain which is information used to generate a license when importing the received content as domain content.

The membership state information may be time information indicating when domain membership of a device which has subscribed to the predetermined domain according to the policy followed by the predetermined domain will expire. If the device withdraws from the predetermined domain and thus is not a member of the predetermined domain any longer, the time when the device withdrew from the predetermined domain is recorded in the membership state information. The content import apparatus 1000 may decide whether to issue a license for the use of domain content to a device with reference to membership state information.

In operation 30, the import function module 1100 of the content import apparatus 1000 issues a request to the DRM client module 1200 for determining whether a domain key (hereinafter referred to as the stored domain key) stored in the DRM client module 1200 needs to be updated, and the DRM client module 1200 may decide whether to issue a request for domain-related data.

In operation 40, the DRM client module 1200 of the content import apparatus 1000 determines whether the stored domain key needs to be updated in response to the request issued by the import function module 1100.

In operation 50, if it is determined that the stored domain key needs to be updated, the DRM client module 1200 of the content import apparatus 1000 issues a domain key update request to the DRM object providing apparatus 3000. Here, the DRM object providing apparatus 3000 is an apparatus for providing the devices which are subscribers of the predetermined domain with domain-related data such that the devices can use domain content present in the predetermined domain.

In operation 60, the DRM object providing apparatus 3000 determines whether the content import apparatus 1000 is adjacent to the DRM object providing apparatus 3000 by performing an adjacency checking operation together with the DRM client module 1200 of the content import apparatus 1000.

In operation 70, if the content import apparatus 1000 is adjacent to the DRM object providing apparatus 3000, the DRM object providing apparatus 3000 transmits an updated domain key to the DRM client module 1200 of the content import apparatus 1000.

In operation 80, the DRM client module 1200 notifies the DRM object providing apparatus 3000 that the updating of the stored domain key with the updated domain key transmitted by the DRM object providing apparatus 3000 has been concluded.

In operation 90, the DRM client module 1200 transmits the updated domain key transmitted by the DRM object providing apparatus 3000 to the import function module 1100.

Figure 6:
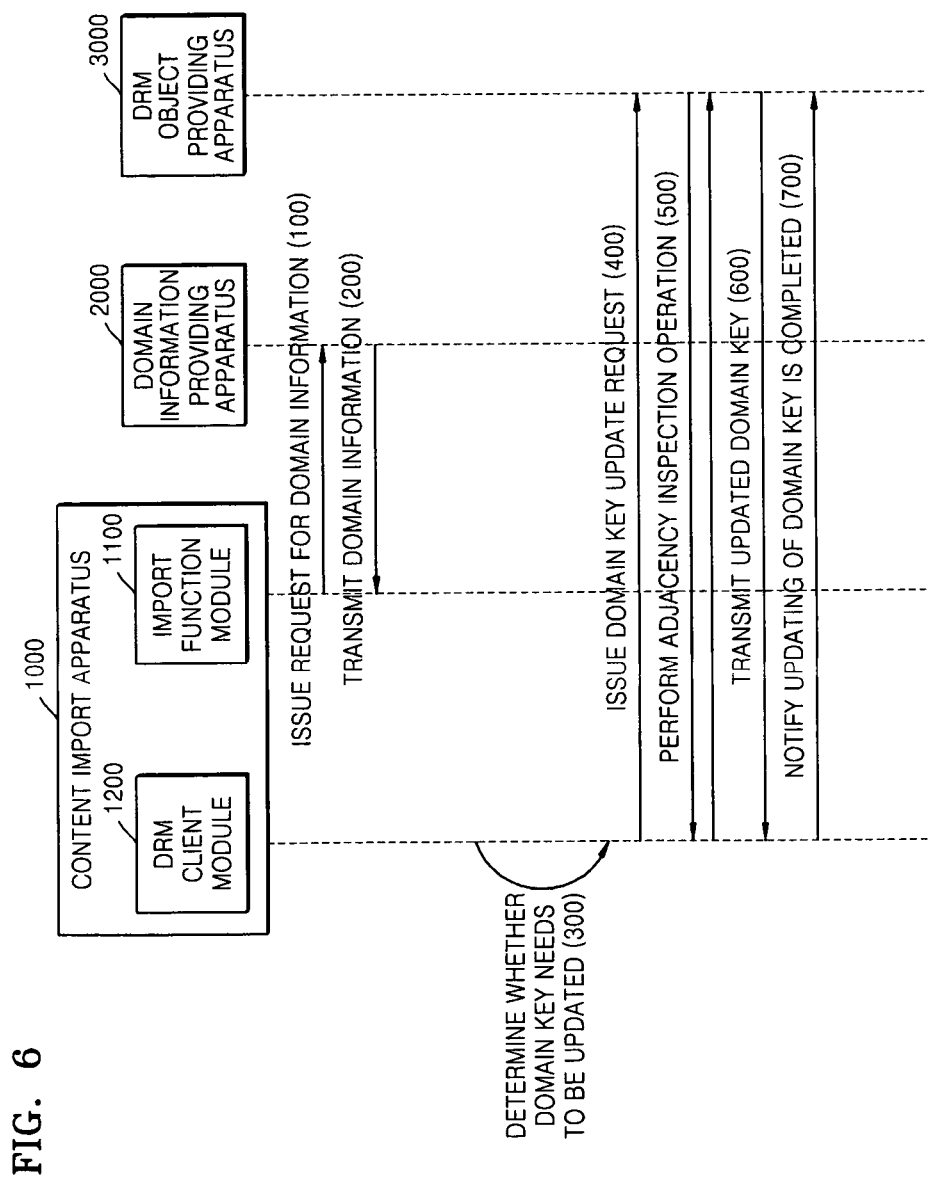
FIG. 6 is a diagram explaining the acquiring of domain information and an updated domain key by an import function module of a content import apparatus according to an exemplary embodiment of the present invention.

FIG. 6 is a diagram for explaining the acquiring of domain-related data by the content import apparatus 1000 illustrated in FIG. 2 according to an exemplary embodiment of the present invention. Referring to FIG. 6, in operation 100, the import function module 1100 of the content import apparatus 1000 issues a request for domain information to the domain information providing apparatus 2000. Here, the domain information providing apparatus 2000 is an apparatus for providing domain information to a plurality of devices which are subscribers of a predetermined domain.

In operation 200, the domain information providing apparatus 2000 transmits a response message containing domain information to the content import apparatus 1000 in response to the request issued by the import function module 1100. Here, the domain information may be information needed to encrypt content received from an external source into domain content according to a set of rules of a DRM system and to issue a license for the use of the domain content.

The response message containing the domain information also contains an identifier of the predetermined domain where domain content corresponding to the received content is to be used, an identifier of a policy followed by the predetermined domain, location information of the predetermined domain, location information of the DRM object providing apparatus 3000 from which domain-related data regarding the predetermined domain can be acquired, an identifier of a domain key which is an encryption key corresponding to the predetermined domain, and membership state information of the predetermined domain which is information used to generate a license when importing the received content as domain content.

The membership state information is time information indicating when domain membership of a device which has subscribed to the predetermined domain according to the policy followed by the predetermined domain will expire. If the device withdraws from the predetermined domain and thus is not a member of the predetermined domain any longer, the time when the device withdrew from the predetermined domain is recorded in the membership state information. The content import apparatus 1000 may decide whether to issue a license for the use of domain content to a device with reference to membership state information.

In operation 300, the DRM client module 1200 of the content import apparatus 1000 determines whether a domain key stored in the DRM client module 1200 needs to be updated. The DRM client module 1200 determines whether the stored domain key needs to be updated by comparing an identifier of the stored domain key with a domain key identifier received from the domain information providing apparatus 2000. If the identifier of the stored domain key and the received domain key identifier are not identical, the DRM client module 1200 determines that the stored domain key needs to be updated.

In operation 400, the DRM client module 1200 issues a domain key update request to the DRM object providing apparatus 3000. Here, the DRM object providing apparatus 3000 is an apparatus for providing the devices which are subscribers of the predetermined domain with domain-related data such that the devices can use domain content present in the predetermined domain.

In operation 500, the DRM object providing apparatus 3000 determines whether the content import apparatus 1000 is adjacent to the DRM object providing apparatus 3000 by performing an adjacency checking operation together with the DRM client module 1200 of the content import apparatus 1000.

In operation 600, if the content import apparatus 1000 is adjacent to the DRM object providing apparatus 3000, the DRM object providing apparatus 3000 transmits an updated domain key to the DRM client module 1200.

In operation 700, the DRM client module 1200 notifies the DRM object providing apparatus 3000 that the updating of the stored domain key with the updated domain key transmitted by the DRM object providing apparatus 3000 has been concluded.

Figure 7:
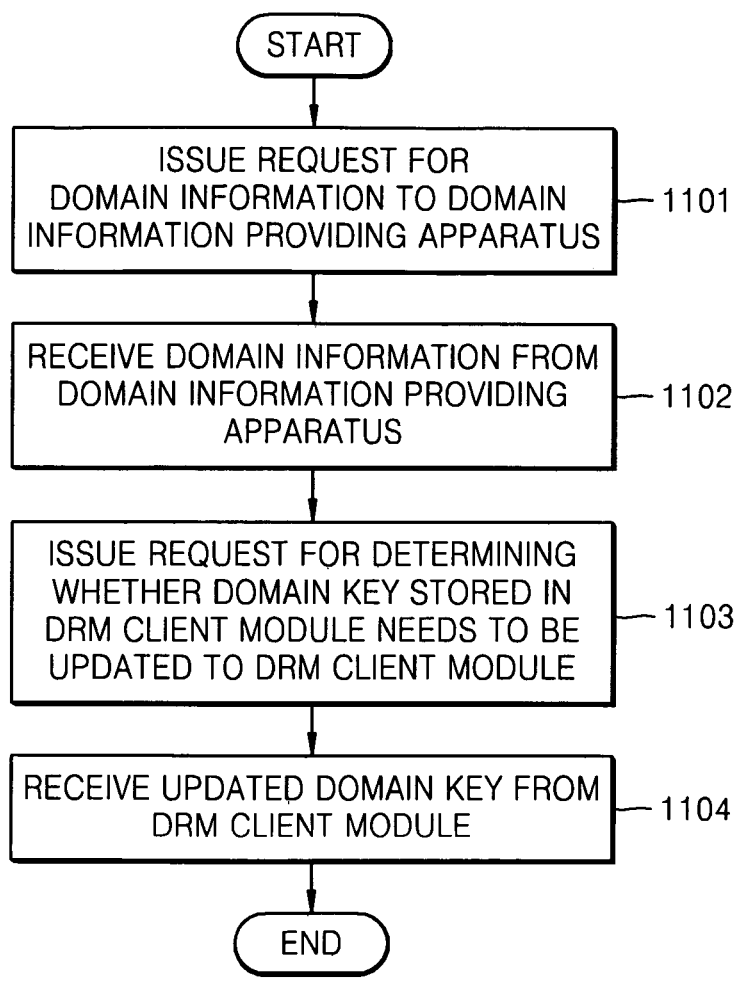
FIG. 7 is a flowchart illustrating the acquiring of domain information and an updated domain key by an import function module of a content import apparatus according to an exemplary embodiment of the present invention.

FIG. 7 is a flowchart illustrating a method of acquiring domain information and an updated domain key which is performed by the import function module 1100 of the content import apparatus 1000 illustrated in FIG. 2, according to an exemplary embodiment of the present invention. Referring to FIG. 7, the import function module 1100 of the content import apparatus 1000 acquires domain information and an up-to-date domain key which are needed to encrypt content received from an external source into domain content according to a set of rules of a DRM system by sequentially performing a plurality of operations which will now be described in detail.

In operation 1101, the import function module 1100 issues to the domain information providing apparatus 2000 a request for domain information which is needed to convert the received content into domain content. Here, the domain information providing apparatus 2000 is an apparatus for providing domain information to a plurality of devices which are subscribers of a predetermined domain and performs almost the same functions as a domain manager of the predetermined domain. The import function module 1100 receives up-to-date domain information from the domain information providing apparatus 2000 and uses the received domain information to convert the received content into domain content.

In operation 1102, the import function module 1100 receives a response message containing domain information in response to the request issued in operation 1101 from the domain information providing apparatus 2000. Here, the domain information is information needed to encrypt content received from an external source into domain content according to a set of rules of a DRM system and to issue a license for the use of the domain content.

The response message containing the domain information also contains an identifier of the predetermined domain where domain content corresponding to the received content is to be used, an identifier of a policy followed by the predetermined domain, location information of the predetermined domain, location information of the DRM object providing apparatus 3000 from which domain-related data regarding the predetermined domain can be acquired, an identifier of a domain key which is an encryption key corresponding to the predetermined domain, and membership state information of the predetermined domain which is information used to generate a license when importing the received content as domain content.

The membership state information may be time information indicating when domain membership of a device which has subscribed to the predetermined domain according to the policy followed by the predetermined domain will expire. If the device withdraws from the predetermined domain and thus is not a member of the predetermined domain any longer, the time when the device withdrew from the predetermined domain is recorded in the membership state information. The content import apparatus 1000 may decide whether to issue a license for the use of domain content to a device with reference to membership state information.

In operation 1103, the import function module 1100 issues a request to the DRM client module 1200 of the content import apparatus 1000 for determining whether a domain key stored in the DRM client module 1200 needs to be updated.

In operation 1104, the import function module 1100 receives from the DRM client module 1200 domain-related data including an updated domain key which is a valid domain key currently being used in the predetermined domain. Here, the updated domain key is a domain key which is commonly shared between the devices which are subscribers of the predetermined domain and is determined as being valid by the content import apparatus 1000. Here, the domain-related data is updated data regarding the predetermined domain, and thus, the updated domain key is part of the domain-related data.

Figure 8:
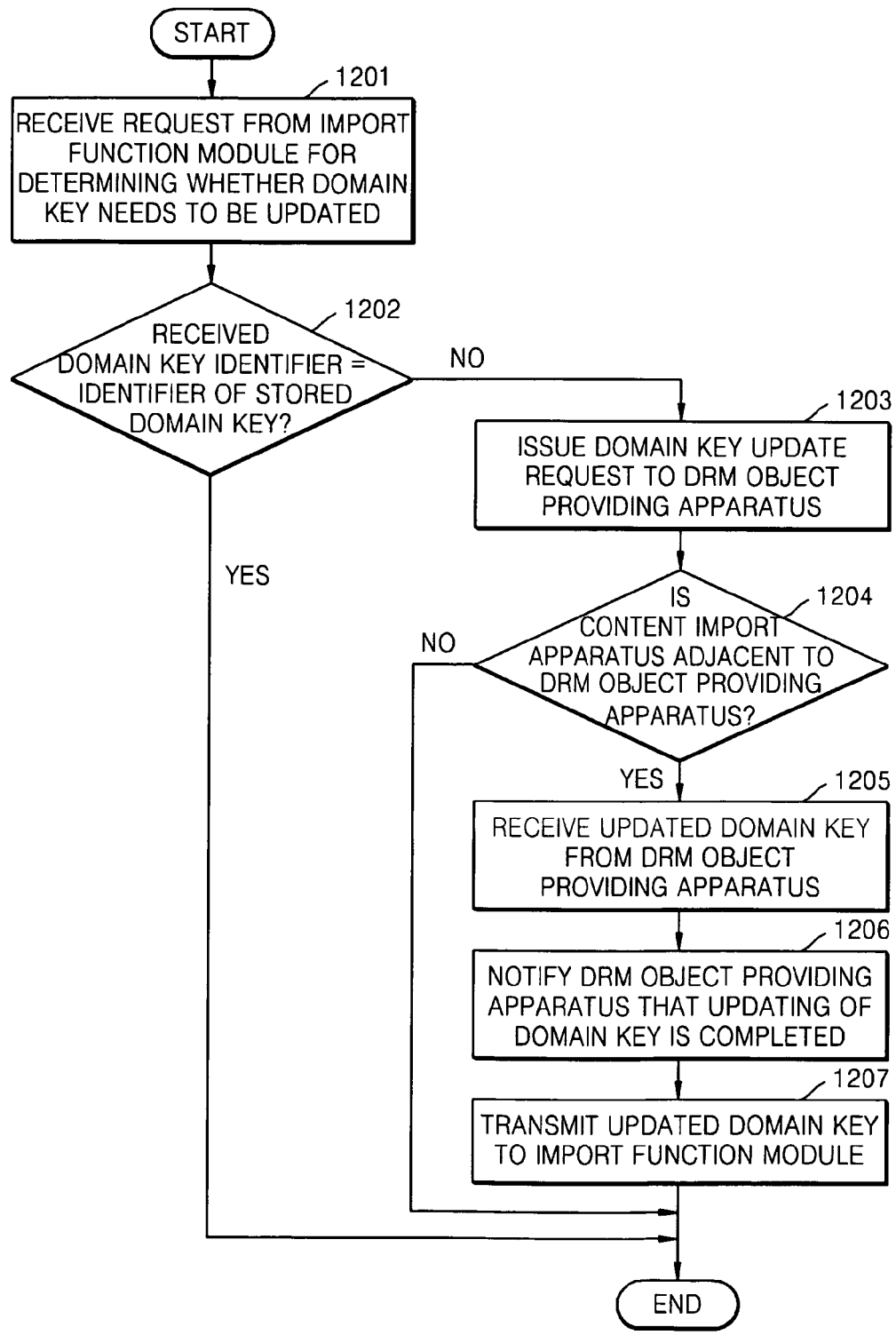
FIG. 8 is a flowchart illustrating the acquiring of an updated domain key by a DRM client module of a content import apparatus according to an exemplary embodiment of the present invention.

FIG. 8 is a flowchart illustrating a method of acquiring an updated domain key which is performed by the DRM client 1200 of the content import apparatus 1000 illustrated in FIG. 2, according to an exemplary embodiment of the present invention. Referring to FIG. 8, the DRM client module 1200 of the content import apparatus 1000 acquires an updated domain key which is a valid domain key currently being used in a predetermined domain by sequentially performing a plurality of operations which will now be described in detail.

In operation 1201, the DRM client module 1200 receives a request issued by the import function module 1100 of the content import apparatus 1000 for determining whether a domain key (hereinafter referred to as the stored domain key) stored in the DRM client module 1200 needs to be updated.

In operation 1202, the DRM client module 1200 determines through comparison whether an identifier of the stored domain key and a domain key identifier received from the domain information providing apparatus 2000 are identical.

Theoretically, if the content import apparatus 1000 is a subscriber of the predetermined domain, the stored domain key is identical to the received domain key, and thus, the identifier of the stored domain key and the received domain key identifier are identical.

A domain manager frequently updates a domain key, for example, whenever a new device subscribes to the predetermined domain or an existing subscriber device withdraws from the predetermined domain, and can thus protect domain content present in the predetermined domain by preventing the domain key from being exposed to devices which are currently not subscribers of the predetermined domain. Sometimes, the content import apparatus 1000 may not be able to receive the domain key updated by the domain manager. In this case, the stored domain key is an earlier version than the version of the received domain key, and thus, the identifier of the stored domain key and the received domain key identifier may not be identical. If the identifier of the stored domain key and the received domain key identifier are identical, there is no need to update the stored domain key, and thus, the method is terminated. If the identifier of the stored domain key and the received domain key identifier are not identical, the method proceeds to operation 1203.

In operation 1203, the DRM client module 1200 transmits a message requesting the updating of the stored domain key to the DRM object providing apparatus 3000. The message transmitted by the DRM client module 1200 includes an identifier of a device which requests the updating of the stored domain key, i.e., an identifier of the content import apparatus 1000, and DRM object context. The DRM object context includes an action name regarding the updating of the stored domain key and a context list including an identifier of the predetermined domain to which the content import apparatus 1000 belongs. Here, the context list may also include a request for domain-related data.

In operation 1204, the DRM client module 1200 determines whether the content import apparatus 1000 is adjacent to the DRM object providing apparatus 3000 by performing an adjacency checking operation together with the DRM object providing apparatus 3000. The adjacency checking operation is initiated by the DRM object providing apparatus 3000. In detail, the adjacency checking unit 1250 of the DRM client module 1200 receives a message transmitted by the DRM object providing apparatus 3000 for the adjacency checking operation and transmits a response message to the DRM object providing apparatus 3000 in return for the received message. Then the DRM object providing apparatus 3000 measures the time taken to receive the message transmitted by the adjacency checking unit 1250 and learns whether the DRM object providing apparatus 3000 is adjacent to the content import apparatus 1000.

If the content import apparatus 1000 is determined through the adjacency checking operation to be adjacent to the DRM object providing apparatus 3000, the method proceeds to operation 1205. Otherwise, the method is terminated.

In operation 1205, the DRM client module 1200 receives from the DRM object providing apparatus 3000 an updated domain key which is shared between a plurality of devices which are subscribers of the predetermined domain. The updated domain key and domain-related data are transmitted by the DRM object providing apparatus 3000 as a message, and the message includes domain key information and DRM object context.

The domain key information included in the message transmitted by the DRM object providing apparatus 3000 is encrypted with a public key of the content import apparatus 1000. The DRM object context included in the message transmitted by the DRM object providing apparatus 3000 includes an action name regarding the updating of the stored domain key and a context list, and the context list includes the identifier of the predetermined domain to which the content import apparatus 1000 belongs and information regarding the predetermined domain.

In operation 1206, the DRM client module 1200 stores the updated domain key transmitted by the DRM object providing apparatus 3000 and transmits a confirmation message to the DRM object providing apparatus 3000 indicating that the updating of the stored domain key has been concluded.

In operation 1207, the DRM client module 1200 transmits to the import function module 1100 the updated domain key transmitted by the DRM object providing apparatus 3000.

Figure 9:
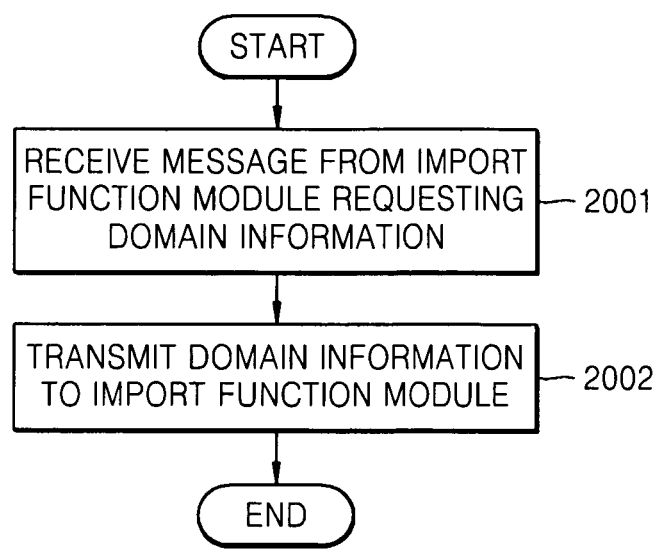
FIG. 9 is a flowchart illustrating the transmission of domain information to a content import apparatus by a domain information providing apparatus according to an exemplary embodiment of the present invention.

FIG. 9 is a flowchart illustrating a method of transmitting domain information from a domain information providing apparatus to a content import apparatus according to an exemplary embodiment of the present invention. Referring to FIG. 9, domain information is transmitted from the domain information providing apparatus 2000 to the content import apparatus 1000 by sequentially performing a plurality of operations which will now be described in detail.

In operation 2001, the domain information providing apparatus 2000 receives a request message from the import function module 1100 of the content import apparatus 1000 requesting domain information needed to import content as domain content.

In operation 2002, the domain information providing apparatus 2000 transmits a response message containing domain information to the import function module 1100 in response to the request message.

The response message containing the domain information also contains an identifier of the predetermined domain where domain content corresponding to the received content is to be used, an identifier of a policy followed by the predetermined domain, location information of the predetermined domain, location information of the DRM object providing apparatus 3000 from which domain-related data regarding the predetermined domain can be acquired, an identifier of a domain key which is an encryption key corresponding to the predetermined domain, and membership state information of the predetermined domain which is information used to generate a license when importing the received content as domain content.

The membership state information may be time information indicating when domain membership of a device which has subscribed to the predetermined domain according to the policy followed by the predetermined domain will expire. If the device withdraws from the predetermined domain and thus is not a member of the predetermined domain any longer, the time when the device withdrew from the predetermined domain is recorded in the membership state information. The content import apparatus 1000 may decide whether to issue a license for the use of domain content to a device with reference to membership state information.

Figure 10:
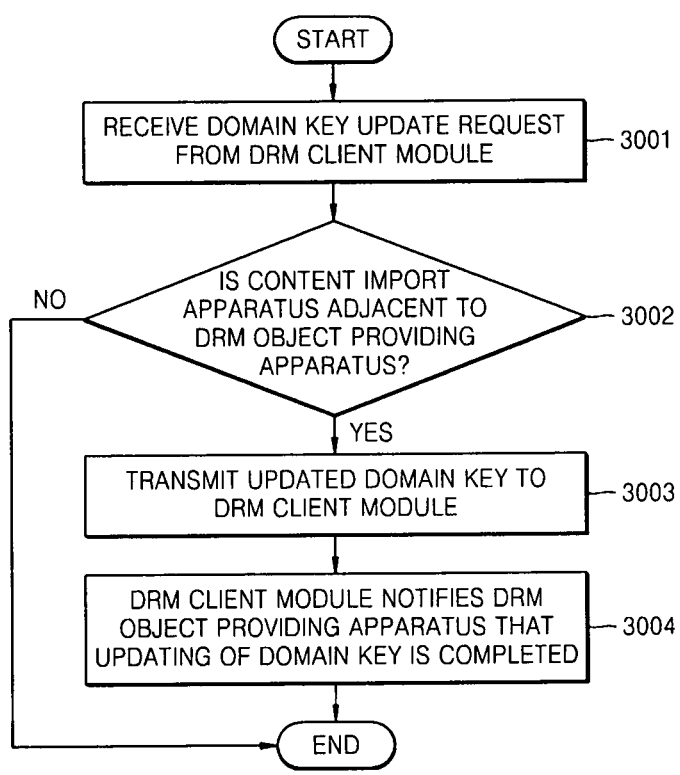
FIG. 10 is a flowchart illustrating the transmission of domain information to a content import apparatus by a DRM object providing apparatus according to an exemplary embodiment of the present invention.

FIG. 10 is a flowchart illustrating a method of transmitting an updated domain key from a DRM object providing apparatus to a content import apparatus according to an exemplary embodiment of the present invention. Referring to FIG. 10, an updated domain key is transmitted from the DRM object providing apparatus 3000 to the DRM client module 1200 of the content import apparatus 1000 by sequentially performing a plurality of operations which will now be described in detail.

In operation 3001, the DRM object providing apparatus 3000 receives a request message from the DRM client module 1200 of the content import apparatus 1000 requesting the updating of a domain key.

The DRM client module 1200 determines that a domain key (hereinafter referred to as the stored domain key) stored in the DRM client module 1200 needs to be updated if an identifier of the stored domain key and a domain key identifier received from the domain information providing apparatus 2000 are not identical. Then the DRM client module 1200 transmits a request message requesting the updating of the stored domain key to the DRM object providing apparatus 3000. The request message transmitted by the DRM client module 1200 includes an identifier of a device which requests the updating of the stored domain key, i.e., an identifier of the content import apparatus 1000, and DRM object context. The DRM object context includes an action name regarding the updating of the stored domain key and a context list, and the context list includes an identifier of the predetermined domain to which the content import apparatus 1000 belongs and information regarding the predetermined domain.

In operation 3002, the DRM object providing apparatus 3000 performs an adjacency checking operation together with the content import apparatus 1000 in order to prevent domain-related data and domain content from being indiscriminately distributed to devices which are not adjacent to the DRM object providing apparatus 3000. The adjacency checking operation may be performed using a round trip time (RTT) method in which the DRM object providing apparatus 3000 transmits a message to the content import apparatus 1000, measures the time taken to receive a response message from the content import apparatus 1000 in return for the message, and determines based on the result of the measurement whether the content import apparatus 1000 is adjacent to the DRM object providing apparatus 3000, however, the present invention is not restricted thereto. If the content import apparatus 1000 is adjacent to the DRM object providing apparatus 3000, the method proceeds to operation 3003. Otherwise, the method is terminated.

In operation 3003, the DRM object providing apparatus 3000 transmits a message containing an updated domain key to the DRM client module 1200. The message transmitted by the DRM object providing apparatus 3000 also contains domain key information and DRM object context.

Here, the updated domain key is a valid domain key which is current being used in the predetermined domain, and the domain key information is encrypted with a public key of the content import apparatus 1000. The DRM object context includes an action name regarding the updating of a domain key and a context list, and the context list includes an identifier of a domain to which the content import apparatus 1000 belongs, i.e., an identifier of the predetermined domain, and information regarding the predetermined domain.

In operation 3004, the DRM object providing apparatus 3000 receives a message indicating that the updating of the stored domain key has been concluded from the DRM client module 1200.

The present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet).

According to exemplary embodiments of the present invention, it is possible to protect domain content by receiving up-to-date domain information from a domain information providing apparatus, receiving an updated domain key which is a valid domain key currently being used in a predetermined domain from a DRM object providing apparatus, and importing content from an external source as domain content that complies with a set of rules of a DRM system so that the domain content can be freely used only by a plurality of devices which are subscribers of the predetermined domain.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A content import apparatus for acquiring data regarding a domain, the apparatus comprising:
an import function apparatus which receives domain information comprising a domain key identifier corresponding to the domain from a domain information providing apparatus and which receives content from an external source; and
a digital rights management (DRM) manager client apparatus which receives an updated domain key which is a valid domain key currently being used in the domain from a digital rights management (DRM) object providing apparatus which is a separate apparatus from the domain information providing apparatus,
wherein the DRM client apparatus determines whether a domain key stored in the DRM client apparatus needs to be updated by using the domain information, and receives the updated domain key when it is determined that the domain key needs to be updated,
wherein the content import apparatus converts the received content into domain content using the domain information and the updated domain key,
wherein the content import apparatus communicates with the domain information providing apparatus of a home network that provides the domain information and with the data rights management (DRM) object providing apparatus of the home network that provides the updated domain key,
the domain information comprises the domain key identifier, an identifier of a policy followed by the domain, location information of the predetermined domain, location information of the DRM object providing apparatus, an identifier of the domain, membership state information that is utilized in license generation for the imported content, and
the content import apparatus provides the imported content with the updated domain key to the devices in the home network for playback.

2. The content import apparatus of claim 1, wherein the import function apparatus comprises:
a first import reception apparatus which receives the domain information from the domain information providing apparatus; and
a second import reception apparatus which receives the updated domain key from the DRM client apparatus.

3. The content import apparatus of claim 2, wherein the import function apparatus further comprises a first import request apparatus which issues a request for the domain information to the domain information providing apparatus, and the first import reception apparatus receives the domain information in response to the request issued by the first import request apparatus.

4. The content import apparatus of claim 2, wherein the import function apparatus further comprises a second import request apparatus which issues a request for determining whether a previously stored domain key needs to be updated to the DRM client apparatus, and the second import reception apparatus receives the updated domain key in response to the request issued by the second import request apparatus.

5. The content import apparatus of claim 1, wherein the DRM client apparatus comprises:
a determination apparatus which determines whether a previously stored domain key needs to be updated;
a request apparatus which issues a domain key update request to a DRM object providing apparatus when the determination apparatus determines that the previously stored domain key needs to be updated; and
a reception apparatus which receives the updated domain key from the DRM object providing apparatus in response to the domain key update request.

6. The content import apparatus of claim 5, wherein the DRM client apparatus further comprises an adjacency checking apparatus which determines whether the content import apparatus is adjacent to the DRM object providing apparatus, and when the content import apparatus is adjacent to the DRM object providing apparatus, the reception apparatus receives the updated domain key in response to the domain key update request.

7. The content import apparatus of claim 5, wherein when an identifier of the previously stored domain key and a domain key identifier received from a domain information providing apparatus are not identical, the determination apparatus determines that the previously stored domain key needs to be updated.

8. The content import apparatus of claim 5, wherein the DRM client apparatus further comprises a transmission apparatus which transmits the updated domain key to the import function apparatus.

9. The content import apparatus of claim 1, wherein content that does not comply with a set of rules of a DRM system is converted into content that complies with the set of rules of the DRM system, and wherein content is imported using the domain information and the updated domain key.

10. An apparatus equipped with an import function apparatus, the apparatus comprising:
a first request apparatus which issues a request for domain information to a domain information providing apparatus;
a first reception apparatus which receives the domain information in response to the request issued by the first request apparatus;
domain content generation apparatus which receives content from an external source; and
a second reception apparatus which receives from an apparatus equipped with a digital rights management (DRM) client apparatus an updated domain key which is a valid domain key currently being used in a domain,
wherein the apparatus equipped with the import function apparatus converts the received content into domain content using the domain information and the updated domain key information,
wherein the apparatus equipped with the DRM client apparatus determines whether a domain key stored in the DRM client apparatus needs to be updated by using the domain information, and receives the updated domain key when it is determined that the domain key needs to be updated,
wherein the apparatus equipped with the DRM client apparatus and the domain information providing apparatus are separate apparatuses,
wherein the apparatus communicates with the domain information providing apparatus of a home network that provides the domain information and with the data rights management (DRM) object providing apparatus of the home network that provides the updated domain key,
the domain information comprises the domain key identifier, an identifier of a policy followed by the domain, location information of the predetermined domain, location information of the DRM object providing apparatus, an identifier of the domain, membership state information that is utilized in license generation for the imported content, and the content import apparatus provides the imported content with the updated domain key to the devices in the home network for playback.

11. The apparatus of claim 10, further comprising a second request apparatus which issues to the apparatus equipped with the DRM client apparatus a request for determining whether a previously stored domain key needs to be updated, wherein the second reception apparatus receives the updated domain key in response to the request issued by the second request apparatus.

12. An apparatus equipped with a digital rights management (DRM) client apparatus, the apparatus comprising:
a determination apparatus which determines whether a previously stored domain key needs to be updated by using domain information received from a domain information apparatus;
a request apparatus which issues a domain key update request to a DRM object providing apparatus when the determination apparatus determines that the previously stored domain key needs to be updated; and
a reception apparatus which receives an updated domain key from the DRM object providing apparatus in response to the domain key update request,
wherein the DRM object providing apparatus and the domain information providing apparatus are separate apparatuses,
wherein the apparatus converts the content into domain content using the updated domain key,
wherein the apparatus communicates with the domain information providing apparatus of a home network that provides the domain information and with the data rights management (DRM) object providing apparatus of the home network that provides the updated domain key,
the domain information comprises the domain key identifier, an identifier of a policy followed by the domain, location information of the predetermined domain, location information of the DRM object providing apparatus, an identifier of the domain, membership state information that is utilized in license generation for the imported content, and
the content import apparatus provides the imported content with the updated domain key to the devices in the home network for playback.

13. The apparatus of claim 12, further comprising an adjacency checking apparatus which determines whether the apparatus is adjacent to the DRM object providing apparatus,
wherein when the apparatus is adjacent to the DRM object providing apparatus, the reception apparatus receives the updated domain key in response to the domain key update request.

14. The apparatus of claim 12, wherein if an identifier of the previously stored domain key and a domain key identifier received from a domain information providing apparatus are not identical, the determination apparatus determines that the previously stored domain key needs to be updated.

15. The apparatus of claim 12, further comprising a transmission apparatus which transmits the updated domain key to an apparatus equipped with an import function apparatus which converts content received from an external source into content that complies with a set of rules of a DRM system.

16. A content import apparatus for acquiring data regarding a domain, the apparatus comprising:
an import function apparatus which receives domain information comprising a domain key identifier from a domain information providing apparatus and which receives content from an external source; and
a digital rights management (DRM) client apparatus which determines whether a previously stored domain key is valid and can thus be used in the domain by using the domain information and which receives an updated domain key from a digital rights management object providing apparatus which is a separate device from the domain information providing apparatus,
wherein the content import apparatus converts the received content into domain content using the domain information and the updated domain key,
wherein the apparatus communicates with the domain information providing apparatus of a home network that provides the domain information and with the data rights management (DRM) object providing apparatus of the home network that provides the updated domain key,
the domain information comprises the domain key identifier, an identifier of a policy followed by the domain, location information of the predetermined domain, location information of the DRM object providing apparatus, an identifier of the domain, membership state information that is utilized in license generation for the imported content, and
the content import apparatus provides the imported content with the updated domain key to the devices in the home network for playback.

17. The content import apparatus of claim 16, wherein if the previously stored domain key is determined as being invalid, the DRM client apparatus receives an updated domain key.

18. The content import apparatus of claim 16, wherein when an identifier of the previously stored domain key and the domain key identifier received by the import function apparatus are not identical, the DRM client apparatus determines the previously stored domain key as being invalid.

19. A method of acquiring data regarding a domain which is performed by a content import apparatus belonging to the domain, the method comprising:
receiving domain information comprising a domain key identifier from a domain information providing apparatus;
determining whether a previously stored domain key needs to be updated by using the domain information; and
receiving an updated domain key from a digital rights management (DRM) object providing apparatus when it is determined that the previously stored domain key needs to be updated,
wherein the receiving domain information is performed by an import function apparatus of the content import apparatus, which converts content received from an external source into domain content that complies with a set of rules of a DRM system the domain information and using the updated domain key, and the receiving the updated domain key is performed by a DRM client apparatus of the content import apparatus, which has requested domain-related data corresponding to the domain,
wherein the apparatus communicates with the domain information providing apparatus of a home network that provides the domain information and with the data rights management (DRM) object providing apparatus of the home network that provides the updated domain key,
the domain information comprises the domain key identifier, an identifier of a policy followed by the domain, location information of the predetermined domain, location information of the DRM object providing apparatus, an identifier of the domain, membership state information that is utilized in license generation for the imported content, and the content import apparatus provides the imported content with the updated domain key to the devices in the home network for playback.

20. The method of claim 19, wherein the receiving the updated domain key comprises:
   determining whether a domain key held by the content import apparatus needs to be updated based on the domain information; and
   issuing a domain key update request to the DRM object providing apparatus when it is determined that the domain key held by the apparatus needs to be updated.

21. The method of claim 20, wherein the receiving the updated domain key further comprises determining whether the content import apparatus is adjacent to the DRM object providing apparatus; and
   receiving the updated domain key from the DRM object providing apparatus in response to the domain key update request if the content import apparatus is adjacent to the DRM object providing apparatus.

22. The method of claim 20, wherein the determining whether the domain key held by the content import apparatus needs to be updated comprises determining that the domain key held by the content import apparatus needs to be updated if an identifier of the domain key held by the content import apparatus and the domain key identifier received from the domain information providing apparatus are not identical.

23. The method of claim 19, wherein the receiving domain information further comprises:
   issuing a request for the domain information to the domain information providing apparatus; and
   receiving the domain information from the domain information providing apparatus in response to the request.

24. A non-transitory computer-readable recording medium storing a computer program for executing a method of acquiring data regarding a domain which is performed by a content import apparatus belonging to the domain, the method comprising:
   receiving domain information comprising a domain key identifier from a domain information providing apparatus;
   determining whether a previously stored domain key needs to be updated by using the domain information; and
   receiving an updated domain key from a digital rights management (DRM) object providing apparatus if it is determined that the previously stored domain key needs to be updated,
   wherein the receiving domain information is performed by an import function apparatus of the content import apparatus, which converts content received from an external source into domain content that complies with a set of rules of a DRM system using the domain information and the updated domain key, and the receiving the updated domain key is performed by a DRM client apparatus of the content import apparatus, which has requested domain-related data corresponding to the domain,
   wherein the apparatus communicates with the domain information providing apparatus of a home network that provides the domain information and with the data rights management (DRM) object providing apparatus of the home network that provides the updated domain key,
   the domain information comprises the domain key identifier, an identifier of a policy followed by the domain, location information of the predetermined domain, location information of the DRM object providing apparatus, an identifier of the domain, membership state information that is utilized in license generation for the imported content, and
   the content import apparatus provides the imported content with the updated domain key to the devices in the home network for playback.

25. A method of acquiring data regarding a domain which is performed by a content import apparatus belonging to the domain, the method comprising:
   receiving domain information comprising a domain key identifier from a domain information providing apparatus; and
   determining whether a domain key held by the content import apparatus is valid and can thus be used in the domain by using the domain information and receiving an updated domain key from a digital rights management (DRM) object providing apparatus which is a separate apparatus from the domain information providing apparatus,
   wherein the receiving is performed by an import function apparatus of the content import apparatus, which converts content received from an external source into domain content that complies with a set of rules of a digital rights management (DRM) system using the domain information and the valid domain key, and the determining is performed by a DRM client apparatus of the content import apparatus, which has requested domain-related data corresponding to the domain,
   wherein the apparatus communicates with the domain information providing apparatus of a home network that provides the domain information and with the data rights management (DRM) object providing apparatus of the home network that provides the updated domain key,
   the domain information comprises the domain key identifier, an identifier of a policy followed by the domain, location information of the predetermined domain, location information of the DRM object providing apparatus, an identifier of the domain, membership state information that is utilized in license generation for the imported content, and
   the content import apparatus provides the imported content with the updated domain key to the devices in the home network for playback.

26. The method of claim 25, wherein the determining further comprises receiving an updated domain key from a DRM object providing apparatus if the domain key held by the content import apparatus is determined as being invalid.

27. The method of claim 25, wherein the determining further comprises determining the domain key held by the content import apparatus as being invalid when an identifier of the domain key held by the content import apparatus and an identifier of the domain key identifier received from the domain information providing apparatus are not identical.

28. A non-transitory computer-readable recording medium storing a computer program for executing a method of acquiring data regarding a domain which is performed by a content import apparatus belonging to the domain, the method comprising:
   receiving domain information comprising a domain key identifier from a domain information providing apparatus; and
   determining whether a domain key held by the content import apparatus is valid and can thus be used in the domain by using the domain information and receiving an updated domain key from a digital rights management (DRM) object providing apparatus which is a separate remote apparatus from the domain information providing apparatus, wherein the receiving is performed by an import function apparatus of the content import apparatus, which converts content received from an external source into domain content that complies with a set of rules of a digital rights management (DRM) system using the domain information and the valid domain key, and the determining is performed by a DRM client apparatus of the content import apparatus, which has requested domain-related data corresponding to the domain, wherein the apparatus communicates with the domain information providing apparatus of a home network that provides the domain information and with the data rights management (DRM) object providing apparatus of the home network that provides the updated domain key, the domain information comprises the domain key identifier, an identifier of a policy followed by the domain, location information of the predetermined domain, location information of the DRM object providing apparatus, an identifier of the domain, membership state information that is utilized in license generation for the imported content, and the content import apparatus provides the imported content with the updated domain key to the devices in the home network for playback.

29. A method of importing content, comprising:
receiving content to be imported by a content import apparatus;
receiving latest information about a domain by the content import apparatus from a domain information providing apparatus;
determining whether a domain key needs to be updated based on the latest information about the domain;
receiving a new domain key from a digital rights management (DRM) object providing apparatus; and
importing the content using the latest information and the new domain key, wherein the DRM object providing apparatus is a separate apparatus from the domain information providing apparatus, wherein the apparatus communicates with the domain information providing apparatus of a home network that provides the domain information and with the data rights management (DRM) object providing apparatus of the home network that provides the updated domain key, the domain information comprises the domain key identifier, an identifier of a policy followed by the domain, location information of the predetermined domain, location information of the DRM object providing apparatus, an identifier of the domain, membership state information that is utilized in license generation for the imported content, and the content import apparatus provides the imported content with the updated domain key to the devices in the home network for playback.

30. The method of claim 29, wherein the DRM object providing apparatus exists within a predetermined physical distance from the domain information providing apparatus.

31. The method of claim 29, wherein the latest information comprises an identifier of the domain.

32. The method of claim 31, wherein the latest information further comprises an identifier of a policy followed by the domain, location information of the DRM object providing apparatus, membership state information of the domain, and an identifier of the domain key.

33. The method of claim 32, wherein the membership state information comprises time information indicating when domain membership of a device which has subscribed to the domain will expire.

34. The method of claim 29, wherein an identifier of the domain is received from the domain providing apparatus and transmitted to the DRM object providing apparatus.

* * * * *